(12) United States Patent
Aggarwal et al.

(10) Patent No.: US 6,886,000 B1
(45) Date of Patent: Apr. 26, 2005

(54) ON-LINE NEGOTIATIONS WITH DYNAMIC PROFILING

(75) Inventors: Alok Aggarwal, Chappaqua, NY (US); Parul Alok Mittal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/407,434

(22) Filed: Sep. 29, 1999

(51) Int. Cl.[7] ............................................. G06F 17/60
(52) U.S. Cl. ......................................... 705/80; 705/26
(58) Field of Search ............................. 705/26, 80, 10, 705/27; 725/60, 61; 395/88.17; 379/92.03, 221.05

(56) References Cited

U.S. PATENT DOCUMENTS

| | | | | |
|---|---|---|---|---|
| 5,668,953 A | * | 9/1997 | Sloo ............................... | 705/1 |
| 5,717,923 A | * | 2/1998 | Dedrick ........................ | 705/10 |
| 5,774,868 A | * | 6/1998 | Cragun et al. ................. | 705/10 |
| 5,794,207 A | * | 8/1998 | Walker et al. .................. | 705/1 |
| 5,832,451 A | * | 11/1998 | Flake et al. ..................... | 705/5 |
| 5,895,450 A | * | 4/1999 | Sloo ............................... | 705/1 |
| 5,915,243 A | * | 6/1999 | Smolen .................... | 379/92.01 |
| 5,933,811 A | * | 8/1999 | Angles et al. ................. | 705/14 |
| 5,940,806 A | * | 8/1999 | Danial .......................... | 705/26 |
| 5,956,687 A | * | 9/1999 | Wamsley et al. .............. | 705/1 |
| 5,991,735 A | * | 11/1999 | Gerace .......................... | 705/1 |
| 6,014,638 A | * | 1/2000 | Burge et al. ................... | 705/14 |
| 6,035,288 A | * | 3/2000 | Solomon ..................... | 705/26 |
| 6,055,513 A | * | 4/2000 | Katz et al. ..................... | 705/26 |
| 6,055,519 A | * | 4/2000 | Kennedy et al. .............. | 705/80 |
| 6,064,980 A | * | 5/2000 | Jacobi et al. .................. | 705/1 |
| 6,119,101 A | * | 9/2000 | Peckover ...................... | 705/26 |
| 6,125,352 A | * | 9/2000 | Franklin et al. .............. | 705/26 |
| 6,151,589 A | * | 11/2000 | Aggarwal et al. ............ | 705/37 |
| 6,236,975 B1 | * | 5/2001 | Boe et al. ..................... | 705/10 |
| 6,330,551 B1 | * | 12/2001 | Burchetta et al. ............. | 705/80 |
| 6,553,347 B1 | * | 4/2003 | Tavor et al. ................... | 705/14 |
| 6,574,628 B1 | * | 6/2003 | Kahn et al. ................... | 707/10 |

FOREIGN PATENT DOCUMENTS

JP 410111804 A * 4/1998 ............. G06F/9/44

OTHER PUBLICATIONS

Taupiac, K. "Manage purchasing with the internet" International Trade Forum (Jan.–Mar. 1999) vol. 1, No. 24.*
"Search Engine and DBMS Directory" Library Technology Reports (Jul. 1998).*
Davis, J. W. "Take your data to the Net" PC/Computing, vol. 10, No. 2 (Feb. 1997).*
"LIMITrader Securities Launches Electronic Bond Trading System to Tap Secondary Market," PR Newswire (May 13, 1998).*
"Exploring Alternatives—A Growing Number Of Sites Offer A Variety Of Services, Ranging From Online Auctions To Detailed Catalogs To Comparative Technical Data," Electronic Buyers News (Jul. 12, 1999).*
Birkhead, E., "Digging with Gopher," LAN Computing, vol. 5, No. 4, (Apr. 1994) p. 23.*
Kerstetter, J., "C/S Learns a Few Web Tricks; Enterprise application vendors tailor intranet wares to extend the back end," PC Week, (Mar. 31, 1997) p. 059.*
"Peoplesoft And Netscape Extend Mission Critical Applications To The Web," Computergram International, No. 3137 (Apr. 11, 1997).*
Gallant, M., "An electronic partner at the negotiating table," Canadian Business Review, vol. 18, No. 3 (Autumn 1991) p. 42.*

* cited by examiner

*Primary Examiner*—Jeffrey A. Smith
(74) *Attorney, Agent, or Firm*—Whitman, Curtis & Christofferson, P.C.; T Rao Coca

(57) ABSTRACT

An e-commerce mechanism tries to dynamically estimate or refine a profile of a buyer and hence change their negotiation strategy in a dynamic and an on-line manner. An e-commerce site can negotiate with a customer based on his or her profile. The e-commerce site may sell one or more types of items to various customers. These customers may be brokers, other intermediaries, businesses or consumers. Similarly, the e-commerce site may be a broker, an auctioneer, an intermediary, a seller, or even a manufacturer. In one specific case of this invention, the existing data on various customers' past purchases, buying behavior, demographics and other parameters is studied to arrive at attributes which are then used to segment customers into various profiles. The profiles depend not only on the demographic factors but also on factors like the season, the time of day, the geographical area and the cultural upbringing. When a new customer comes to the e-commerce site, the customer is assigned to a pre-specified profile in an on-line manner. The e-commerce site then negotiates with the customer according to the customer's present profile. As the customer negotiates, the customer's profile is dynamically updated to incorporate the customer's actions. Different profiles may yield different negotiation strategies and also different results, i.e., value, price, points, delivery dates, etc. Both the customer and the e-commerce site can negotiate on the basis of each other's dynamic profiles and come to a mutually agreed settlement.

19 Claims, 8 Drawing Sheets

ON-LINE NEGOTIATIONS WITH DYNAMIC PROFILING

BACKGROUND OF THE INVENTION

1. Field of the Invention

The present invention generally relates to electronic commerce, so-called "e-commerce", on distributed networks such as the Internet and, more particularly, to an on-line negotiation methodology in which an e-commerce site can negotiate with a customer based on his or her dynamic profile.

2. Background Description

There are several books and articles in the literature describing human negotiations. We refer to Center for Information Technology and Management's (CITM's) project on auctions and bargaining in electronic commerce, Fisher Center for Information Technology and Management, University of California, Berkeley, in this regard. For more details, see http://www.haas.berkeley.edu/~citm/auction/index.html. In this project, they also discuss the mathematical notion of negotiations in the form of state space and utility functions. Generally speaking, in these negotiations, the formulation of profiles is done by human beings, consciously and subconsciously.

The following describes a typical merchant-customer scenario (e.g., imagine a customer walking into an automobile showroom in the USA). Say, a customer walks into a physical store. The sales person forms an opinion of this customer's buying behavior, say, by observing the customer's appearance and body expressions, and mentally assigns a profile to the customer. Typically, this assignment is usually done on a subconscious level mainly, through a "gut feeling". In a similar manner, the customer also assigns a profile to this sales person (e.g., by finding about the sales person from his or her past behavior). Then they both negotiate with each other according to the profile that they have assigned to the other party. As the negotiation proceeds, they keep updating the mental formulation of each other's profiles. Finally, either the negotiation breaks off or they come to a mutually agreed settlement.

No prior art is known that incorporates human nature in electronic negotiations, i.e., no one has provided an apparatus or a methodology for producing an "intelligent decision support system" for negotiations.

Both buyer initiated as well as seller initiated negotiations can be seen in the market today either in the form of haggling or a single or a multiple round bidding system. In U.S. Pat. No. 5,794,207 to Walker et al., there is proposed a method and an electronic apparatus that allows prospective buyers of goods and services to communicate a binding purchase offer globally to potential sellers, for sellers to conveniently search for relevant purchase offers, and for sellers potentially to bind a buyer to a contract based on the buyer's purchase offer. An example of this system can be seen in the Priceline.com business (see http://www.priceline.com), or in electronic procurement models.

Carrie Beam et al. in "CITM Working Paper 96-WP-1019: Electronic Negotiations through Internet-based Auctions", Fisher Center for Information Technology and Management, University of California, Berkeley, December 1996, mention a pricing policy based on a customer's willingness to pay by dividing the market into segments and offering each segment a different price, all of this being done off-line. This methodology is applied by banks currently in giving mortgages, loans, deciding credit-ard limits, etc.

In U.S. Pat. No. 5,774,868 to Cragun et al., there is proposed an electronic sales promotion system that is based on recent customer purchases. Smolen et al. in U.S. Pat. No. 5,915,243 describe a method and apparatus for delivering promotions to a person, household or business on the basis of a dynamic information profile for that person, household or business, the dynamic information profile being formed by creating an initial information profile for the person, household or business, selecting one or more questions based on the information profile, presenting the one or more questions to a person, household or business, collecting the responses to the one or more questions, and updating the information profile using the responses to the questions.

SUMMARY OF THE INVENTION

It is therefore an object of the present invention to provide a set of mechanisms which tries to dynamically estimate or refine the profile of the buyer and hence change their negotiation strategy in a dynamic and an on-line manner.

According to the invention, there is provided a methodology wherein an e-commerce site can negotiate with a customer based on his or her profile. The e-commerce site may sell one or more types of items to various customers. These customers may be brokers, other intermediaries, businesses or consumers. Similarly, the e-commerce site may be a broker, an auctioneer, an intermediary, a seller, or even a manufacturer. In one specific case of this invention, the existing data on various customers' past purchases, buying behavior, demographics and other parameters is studied to arrive at attributes which are then used to segment customers into various profiles. The profiles depend not only on the demographic factors but also on factors like the season, the time of day, the geographical area and the cultural upbringing. When a new customer comes to the e-commerce site, the customer is assigned to a pre-specified profile in an on-line manner. The e-commerce site then negotiates with the customer according to the customer's present profile. As the customer negotiates, the customer's profile is dynamically updated to incorporate the customer's actions. Different profiles may yield different negotiation strategies and also different results, i.e., value, price, points, delivery dates, etc. This invention allows both the customer and the e-commerce site to negotiate on the basis of each other's dynamic profiles and come to a mutually agreed settlement.

The e-commerce site can be either a seller, a broker, an auctioneer or an intermediary and the customer can be either a buyer, a broker, an intermediary, or a consumer. In one embodiment of this invention, an on-line e-commerce site negotiates with a customer based on the customer's dynamically changing profile. From the past history that the site has about various other customers, it determines various profiles to segment all past customers. These profiles themselves are based on multiple value attributes, a few of which may be non-quantitative and hence fuzzy, e.g., time of the day, the season, his/her cultural upbringing, etc. When a new customer comes to the e-commerce site, the site decides which profile the customer belongs to and then begins to negotiate accordingly. The initial assignment to a profile is based on whatever information is available about the customer at the time of assignment. During negotiations, the e-commerce site may change customer's profile based on customer's observed behavior. Thus, the customer's profile and the negotiations done by e-commerce site may vary dynamically during the negotiation process.

In a second embodiment, the e-commerce site will be able to capture not only the customer's "click-through stream"

(i.e., the movement of the customer on the worldwide web (WWW), some intra-nets, extra-nets or the Internet) and other direct interaction with the site, but also the customer's voice and physical actions. This will enable the e-commerce site to judge the customer more accurately (because the facial and body expressions of the customer may yield some behavioral patterns that may be useful to the e-commerce site during negotiations) and thus formulate a better customer profile. The e-commerce site negotiates with the customer using the customer's current profile. During the negotiations with the customer, the site-will dynamically update the customer's profile based on the customer's speech and actions. As a result, the e-commerce site will be able to negotiate with the customer in a more personalized manner, thereby, hoping for future loyalty from the customer.

In a third embodiment, the customer captures the e-commerce site's actions and formulates a profile of the site. Such profiles are often possible because many negotiations on the worldwide web and the Internet are open for anyone to watch or participate. When the customer visits the e-commerce site, he or she has some predetermined profile of the e-commerce site. He or she negotiates with the e-commerce site based on site's present profile. As the customer and the e-commerce site interact, the customer dynamically keeps modifying the site's profile to incorporate its actions. The site's actions could be the questions that it asks the customer, the layout of the e-commerce site on the web, the prices of various items, various other features that the site may wish to reveal (such as the inventory that is available with the site), etc. Thus, the customer dynamically changes his or her negotiation strategy towards the e-commerce site. Again, in addition to being somewhat personalized, the customer gets a "buying experience" that may be fairly close to the actual experience in the real-world; and, he or she may feel more satisfied with the negotiated settlement.

Negotiation can be seen as a type of search, with buyers and sellers searching through a space of feasible solutions and trying to determine the optimal one for themselves. In the most general embodiment of this patent, the e-commerce site and the customer both judge each other, formulate each other's profile and negotiate accordingly. When the customer visits the e-commerce site, both the customer and the e-commerce site assign some initial profile to each other that is based on the information available (at the time of assignment). While they interact, each captures the other's actions, updates their respective profile assignments and negotiation strategies accordingly. Again, in the most general form of the embodiment, the actions need not be only "click-through streams" but may involve the human-computer Interfaces on both sides. These interfaces may include speech, facial and body expressions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
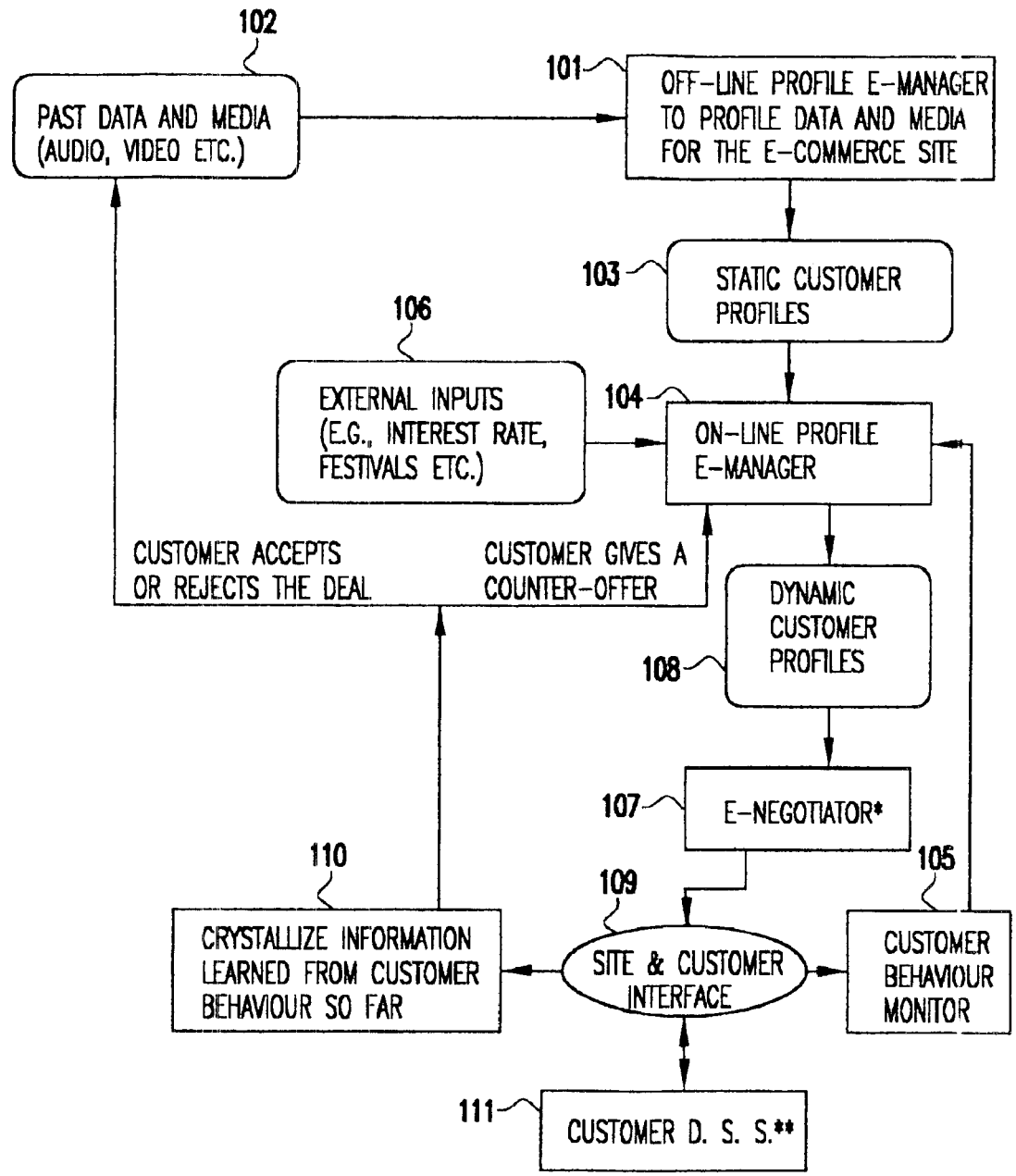
FIG. 1 is a flowchart of the e-commerce site's decision support system for on-line negotiations according to the invention.

Referring now to the drawings, and more particularly to FIG. 1, there is shown the e-commerce site's decision support system (DSS) for on-line negotiations according to the invention. It will be understood from the following description that, according to the preferred embodiment of the invention, the customer will have a similar decision support system.

The Off-line Profile e-manager 101 analyses the available Past Data and Media 102 of the customers' previous purchases from various off-line or on-line stores, including itself. The Off-line Profile e-manager 101, described in more detail with reference to FIG. 5, can use various data-mining and media-mining techniques on the past records to compute and update the Static Customer Profiles 103. When a customer visits the e-commerce site, the On-line Profile e-manager 104, described in more detail with reference to FIG. 6, assigns an initial profile to the customer. If the customer is visiting the site for the first time, initial profile assignment is done based on the information available about the Customer, at the time of assignment, and the Static Customer Profiles 103. If the customer has visited the site earlier, the last visit's customer profile is used. Customer Behavior Monitor 105 starts monitoring the customer's click-through, speech, facial and body expressions, and continues to do so until the customer exits the site. Customer Behavior Monitor 105, described in more detail with reference to FIG. 7, tries to capture the customer's demographic, behavioral as well as technographic information and relays the data to the On-line Profile e-manager 104. (Technographic refers to the information such as the customer's computer and network, kind of browser and operating system used by the customer, his or her Internet service provider (ISP), time of the day he or she visited, that the customer's browser can send to the e-site.) The On-line Profile e-manager 104 uses external inputs 106, like the seasonal variations, festivals and cultural upbringing factors, Static Customer Profiles 103, inputs from Customer Behavior Monitor 105 and the feedback from the e-negotiator 107 to compute and update the Dynamic Customer Profiles 108. An e-negotiator may be a human who is negotiating on behalf of the e-commerce site or may be a computer program or device (i.e., hardware or software) sitting on the other side. The e-negotiator 107 is described in more detail with reference to FIG. 8. The Dynamic Customer Profiles 108 are the profiles currently assigned to the various customers and are updated dynamically to reflect the customer's behavior and other environmental factors. The e-negotiator 107 negotiates with the customer based on the customer's dynamic profile. The site and customer interact at 108 providing input to the customer behavior monitor 105 which is fed back to the On-line Profile e-manager 104. The e-negotiator 107 could offer an incentive, ask for the customer's quote or cross-sell some product based on the customer's dynamic profile. Information learned from the customer is crystalized at 110 and fed back to the past data and media database 102 and to the On-line Profile e-manager 104. For example, if the customer proposes a counter offer, the information is sent to the On-line Profile e-manager 104, so that this can be incorporated in the customer's dynamic profile. The e-negotiator 107 then uses the updated customer profile to further negotiate with the customer. If the customer accepts or rejects the deal, the information is sent to the Past Data and Media 102 for further analysis. The Customer Decision Support System (DSS) 111 provides support for the site and customer interaction 109 may be a human or a computer program or device. The Customer Decision Support System (DSS) 111 is the mirror image of the e-commerce site Decision Support System (DSS) just described. Please note that all or some of this computation and negotiation can be done by a computer program or a device with the remaining portion being done by the humans.

The following section describes some of the possible scenarios for on-line negotiations with dynamic profiling. The precondition for the scenarios is that the e-commerce site uses the data on various customer's past purchases and creates some customer profiles. This precondition is valid for all following flows.

Common Flow

Figure 2:
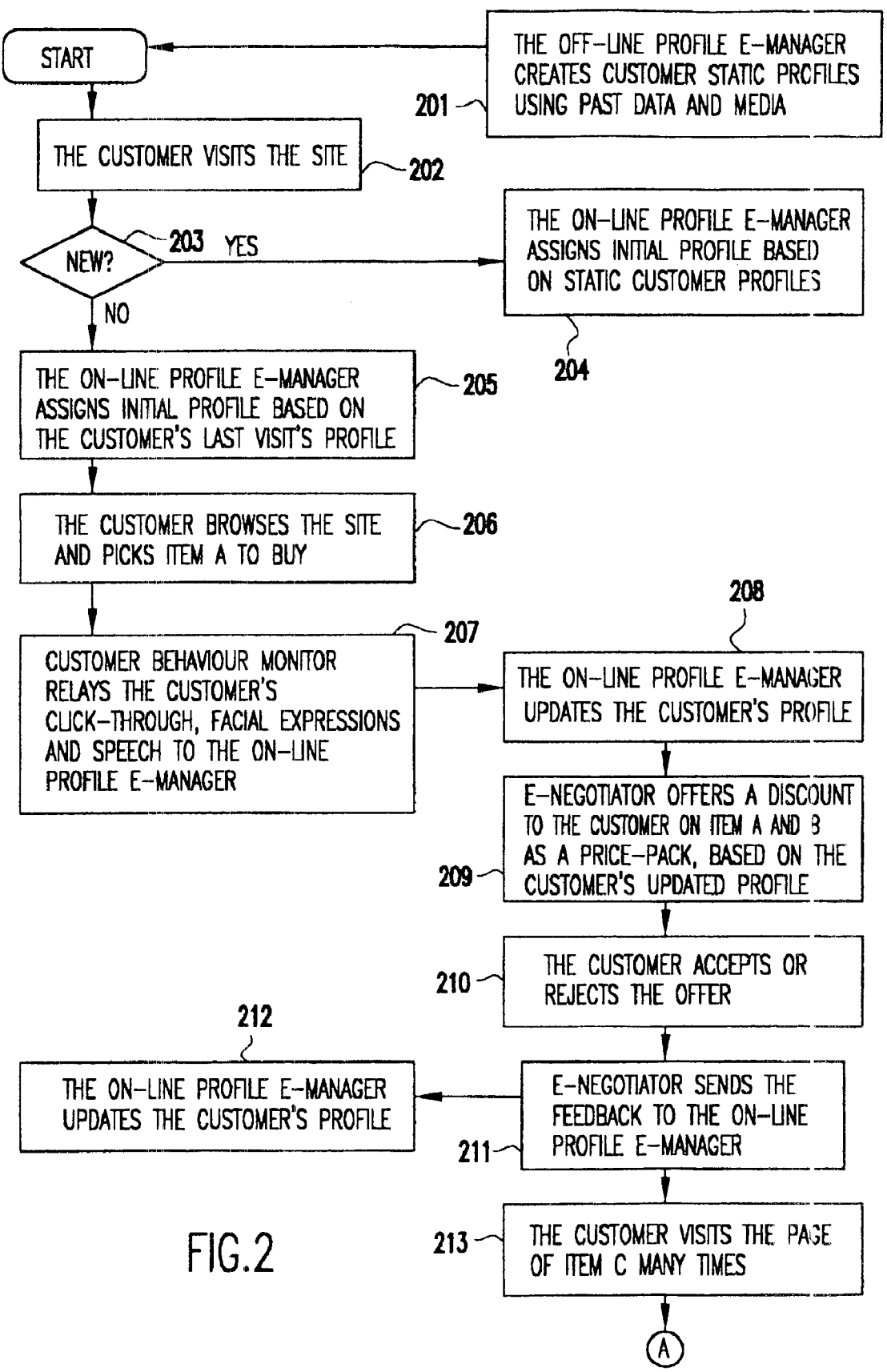
FIG. 2 is a flowchart showing the process for the scenario where the customer picks and item to buy.

With reference now to FIG. 2, the precondition to the flow is shown at 201; that is, the Off-line Profile e-manger has created Customer Static Profiles using Past Data and Media. The process starts by a customer visiting the e-commerce site at 202. The e-commerce site determines at 203 the profile that best describes the customer. If the customer is visiting the site for the first time, profile assignment is done at 204 based on whatever information about the customer is available. If the customer has visited the site earlier, the customer will already have a profile assigned to him or her, from the previous visit, and this assigned profile is retrieved at 205.

The customer browses through the e-commerce site at 206. The e-commerce site Customer Behavior Monitor captures and analyzes the customer's click-through stream at 207. The information is dynamically used to update the customer's initial profile at 208.

The Customer Picks an Item A to Buy

In this scenario, it is assumed that the customer decides at step 206 to pick an item A to buy. The e-commerce site determines, based on customer's current profile, that this particular customer is likely to be interested in an item B as well. The e-commerce site suggests the customer buy item A and B as a price-pack, at some discount at 209. The customer accepts or rejects the offer at 210, and this information is fed back by the e-negotiator to the On-line Profile e-manager at 211. The e-commerce site On-line Profile e-manager updates the customer profile to incorporate customer's action at 212. The updated profile is then used to negotiate in the rest of the transaction or in later transactions with the customer.

The Customer Shows Some Interest in an Item

Figure 3:
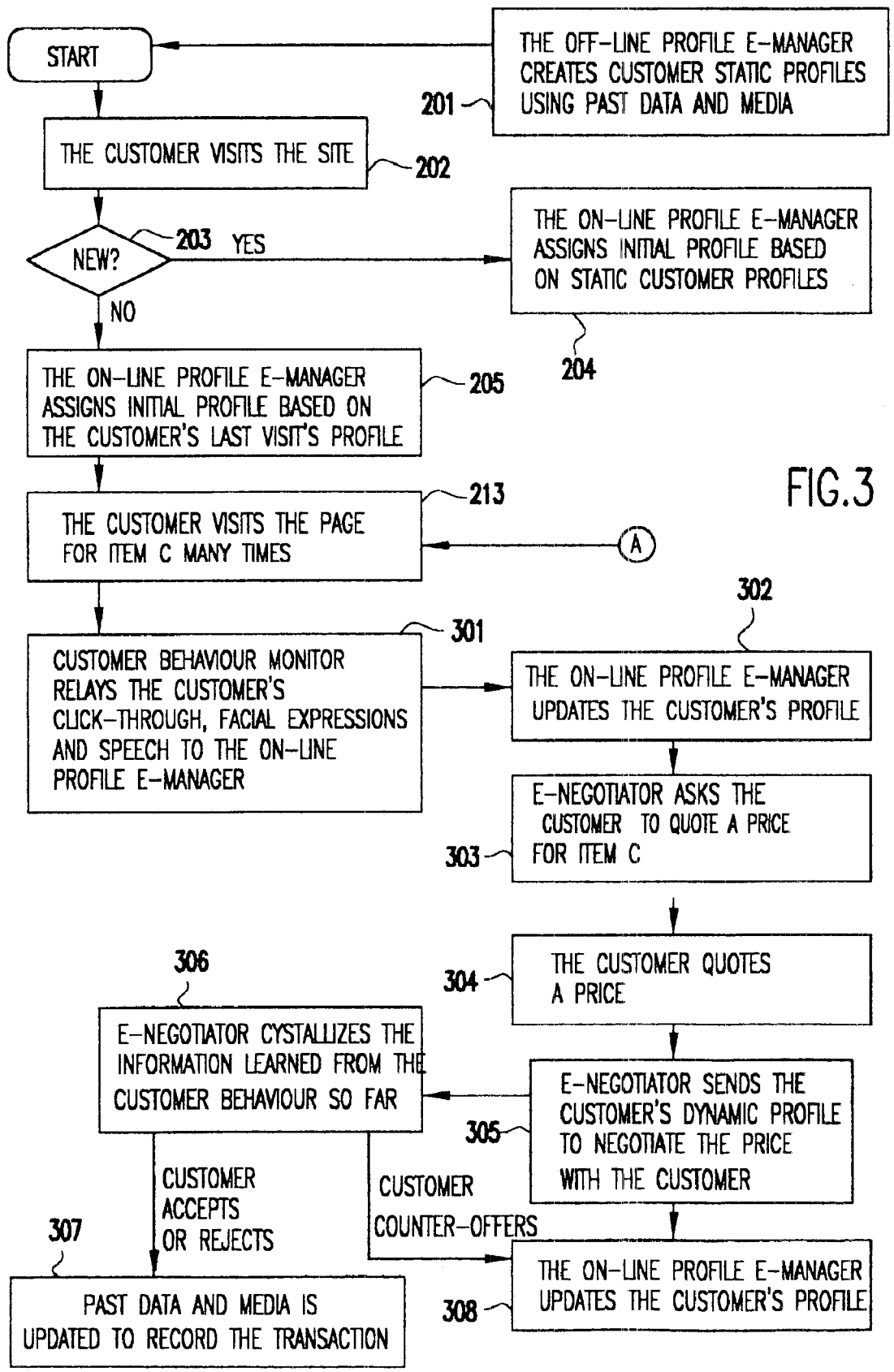
FIG. 3 is a flowchart showing the process for the scenario where the customer shows some interest in an item.

In the same or different transaction, the customer views the details of an item C for a long period of time or visits the item C page many times. This is indicated at 213 if in the same transaction. The process flow then goes to block 213 in FIG. 3. Note that this scenario could be part of a different transaction which begins at the top of FIG. 3 with the common flow already described with respect to FIG. 2.

The e-commerce site Customer Behavior Monitor which has been capturing the customer behavior relays the customer's click-through, facial expressions and speech to the On-line Profile e-manager at 301. The On-line Profile e-manager updates the customer's profile at 302, decides that the customer is interested in buying item C. The e-commerce site asks the customer to quote a price for the item C at 303. The customer may quote a price for item C at 304. The customer may ignore the question, in which case the site updates the customer profile to reflect the same. If the customer quotes a price for item C at 304, the e-commerce site checks if the quoted price is in accordance with the expected quoted price from customer's profile. If the site-decides that the price is acceptable, it offers the product to the customer at the quoted price. The customer may decide to buy the item C at the agreed price. The customer can decide not to buy the item, even though the site may have accepted the customer's quoted price.

The e-commerce site could also decide that the customer has quoted a price lower than acceptable and reject the customer's quote. In any case, the site uses the customer's quote to modify customer's dynamic profile suitably at 305. The e-negotiator rejects the customer's price and then crystallizes the information learned from the customer behavior so far at 306. The e-negotiator offers the item C at a higher price. The customer may either accept or reject the higher price, in which case this information is passed to the Past Data and Media to update that database at 307. The customer may also make a counter offer. This causes the On-line Profile e-manager to update the customer's profile at 308, and the process goes back to 305 where the e-negotiator uses the customer's dynamic profile to negotiate the price with the customer.

The Customer Follows Some Click-through Sequence

Figure 4:
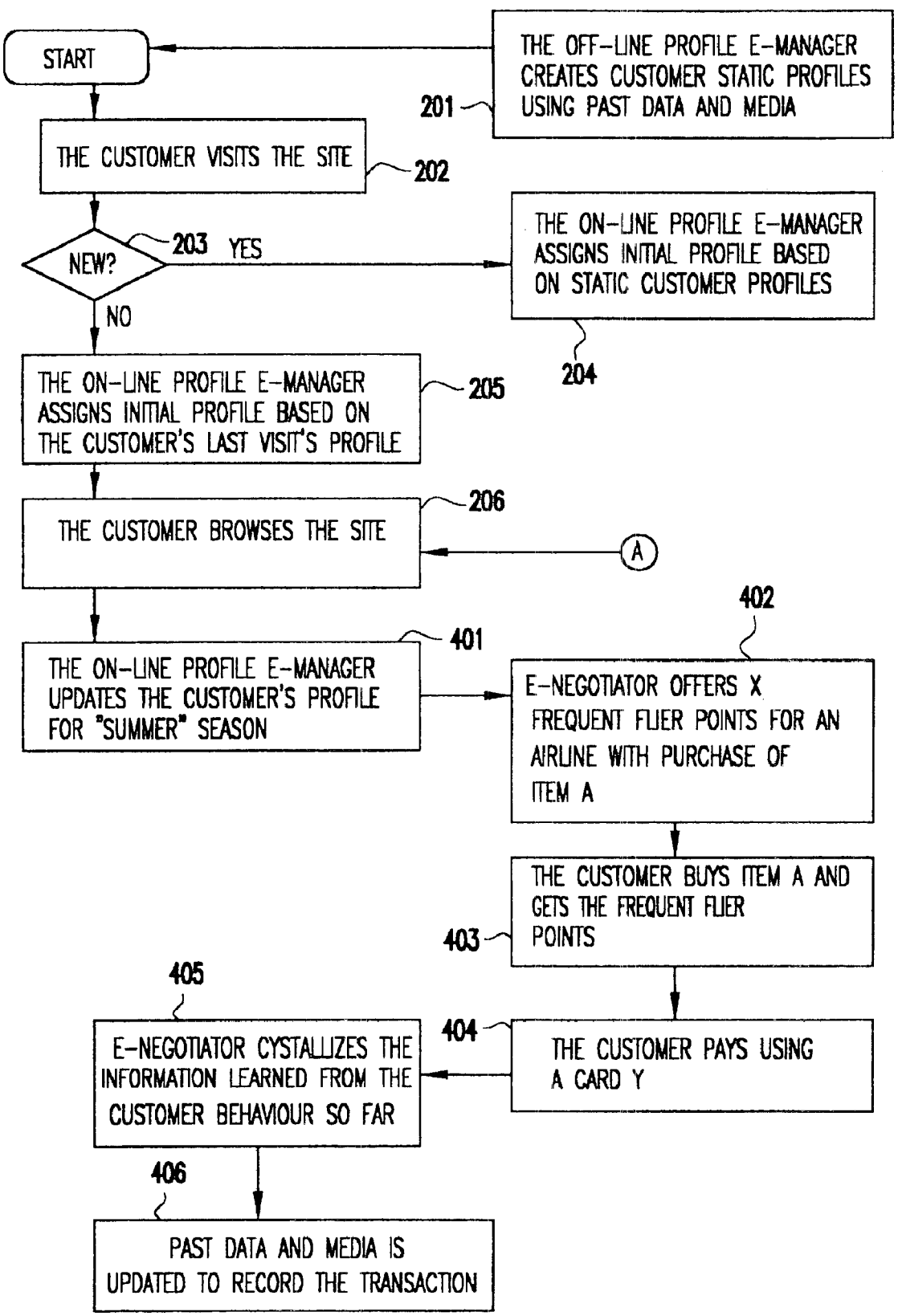
FIG. 4 is a flowchart showing the process for the scenario where the customer follows some click-through sequence.

In the next scenario shown in FIG. 4, the common flow has been followed to 206 where the customer browses the site. In this scenario, the On-line Profile e-manager updates the customer's profile for, say, the "summer" season at 401. The e-commerce site determines, based on the customer's profile, click-through sequence and the season, summer, that the customer is likely to be interested in say frequent flier points. The e-commerce site informs the customer that buying a particular item A could reward some frequent flier points at 402. This bonus entices the customer buys the item A at 403. The customer purchases the item A using a brand-card/store-card/credit-card at 404. The e-commerce site can decide to offer a discount to the customer based on the card used. The e-commerce site uses the information about the type of the card used to update customer's profile. The e-negotiator crystalizes the information learned from the customer behavior so far at 405, and this information is passed on to the Past Data and Media database at 406.

These scenarios represent but a small sampling of the infinite variety of transactions that may take place between a customer and an e-commerce site, and those skilled in the art will recognize many variations from combinations and permutations of the described scenarios. While these scenarios are depicted in terms of the processes on the e-commerce site's side, it will be understood that the same processes apply to the customer's side.

Figure 5:
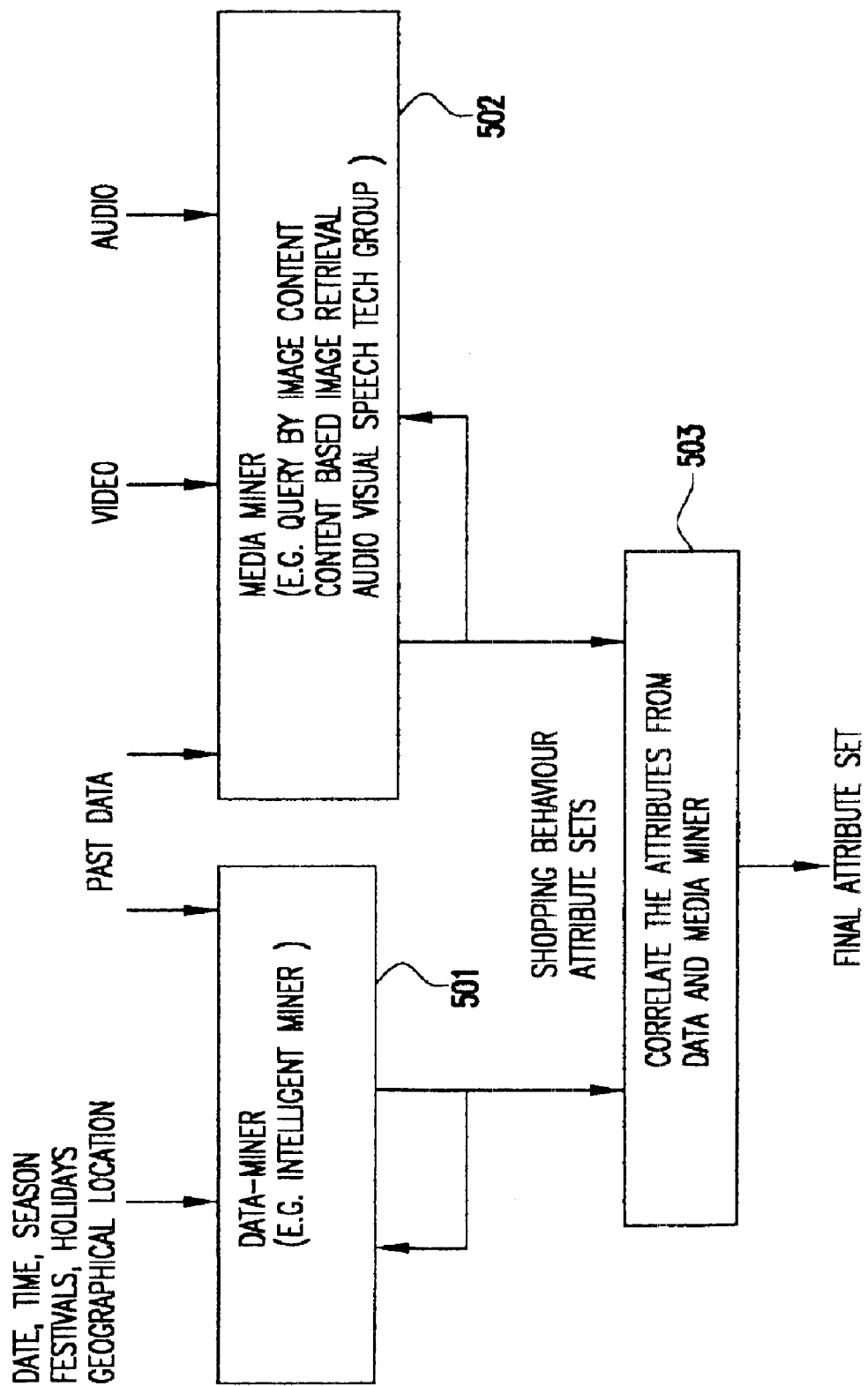
FIG. 5 is a flowchart showing in more detail the off-line profile e-manager of FIG. 1.

Referring back to FIG. 1, the Off-line Profile e-manager 101 for the e-commerce site (conversely, the customer's site) is shown in more detail in FIG. 5. The first component of the Off-line Profile e-manager 101 is a data miner 501 which receives date, time, season, festivals, holidays, geographical location and the like information and also receives past data. The data miner 501 may be, for example, an intelligent miner as described in "Intelligent Miner for Data Applications Guide" by Peter Cabena et al., International Technical Support Organization, International Business Machines Corp. (IBM), November 1998 (also available from http://www.redbooks.ibm.com). The second component is a media miner 502 which receives past data as well as video and audio information. The media miner 502 is a Query by Image Content (QBIC) system as described, for example, by M. Flickner et al. in "Query by image and video content: The QBIC system", IEEE Computer, 2B, September 1995, pp. 23–32. The media minor 502 may also be implemented by a Content Based Image Retrieval (QBIR) system. See Chung-Seng Li et al, "S-STIR: Similarity Search Through Iterative Refinement", SPIE *Conference on Storage and Retrieval for Image and Video Databases VI*, San Jose, Calif., 1998; W. Y. Ma et al., "Netra: A toolbox for navigating large image databases", *Proceedings of IEEE International Conference on Image Processing*, 1987; and Thomas S. Huang et al., "MARS: Multimedia Analysis and Retrieval System project", *Proceedings of 33$^{rd}$ Annual Clinic on Library Application of Data Processing—Digital Image Access and Retrieval*, 1996.

The media miner 502 performs data retrieval in response to query by image content. The outputs of the data miner 501 and the media miner 502 are shopping behavior attribute sets which are input to correlator 503 which correlates the attributes from the data miner 501 and the media miner 502 and provides a final attribute set to the static customer profiles (103 in FIG. 1). In the case of the customer decision support system (DSS), instead of shopping behavior sets, the data miner 501 and the media miner 502 would provide e-commerce site behavior sets, such as combination deals, sales, discounts, and the like.

Figure 6:
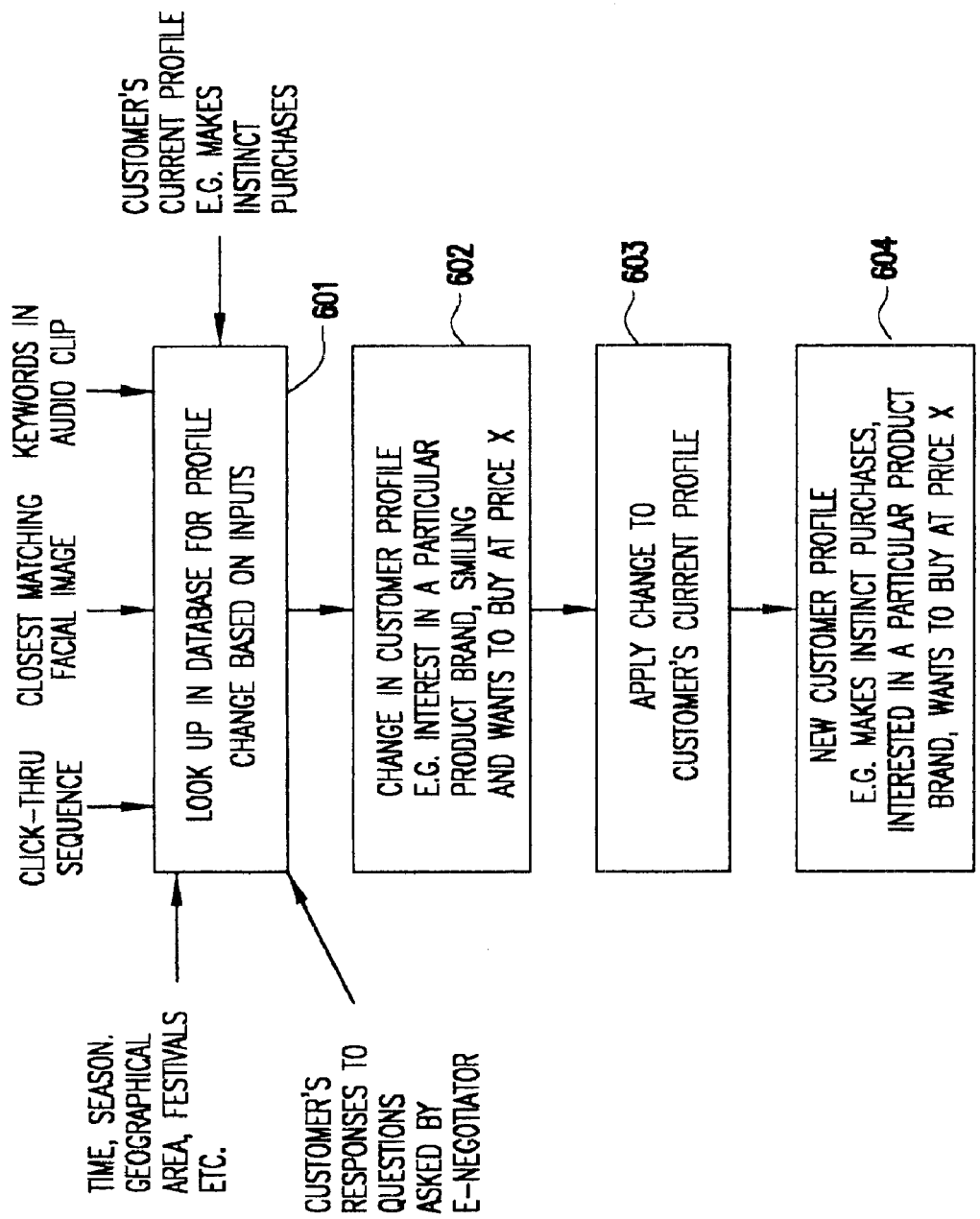
FIG. 6 is a flowchart showing in more detail the on-line profile e-manager of FIG. 1.

The On-line Profile e-manager 104 shown in FIG. 1 is shown in more detail in FIG. 6. The input component is a search engine 601 which looks in a database for profile change based on inputs. These inputs include (1) the customer's responses to questions asked by the e-negotiator, (2) time, season, geographical area, festivals, etc., (3) click-through sequence of the customer, (4) a closest matching facial image, (5) keywords in an audio clip, and (6) the customer's current profile. The profile change is then used at 602 to change the customer profile as, for example, the customer shows an interest in a particular product brand, smiling and wants to pay a certain price. This change is applied to the customer's current profile at 603 to generate a new customer profile at 604.

Figure 7:
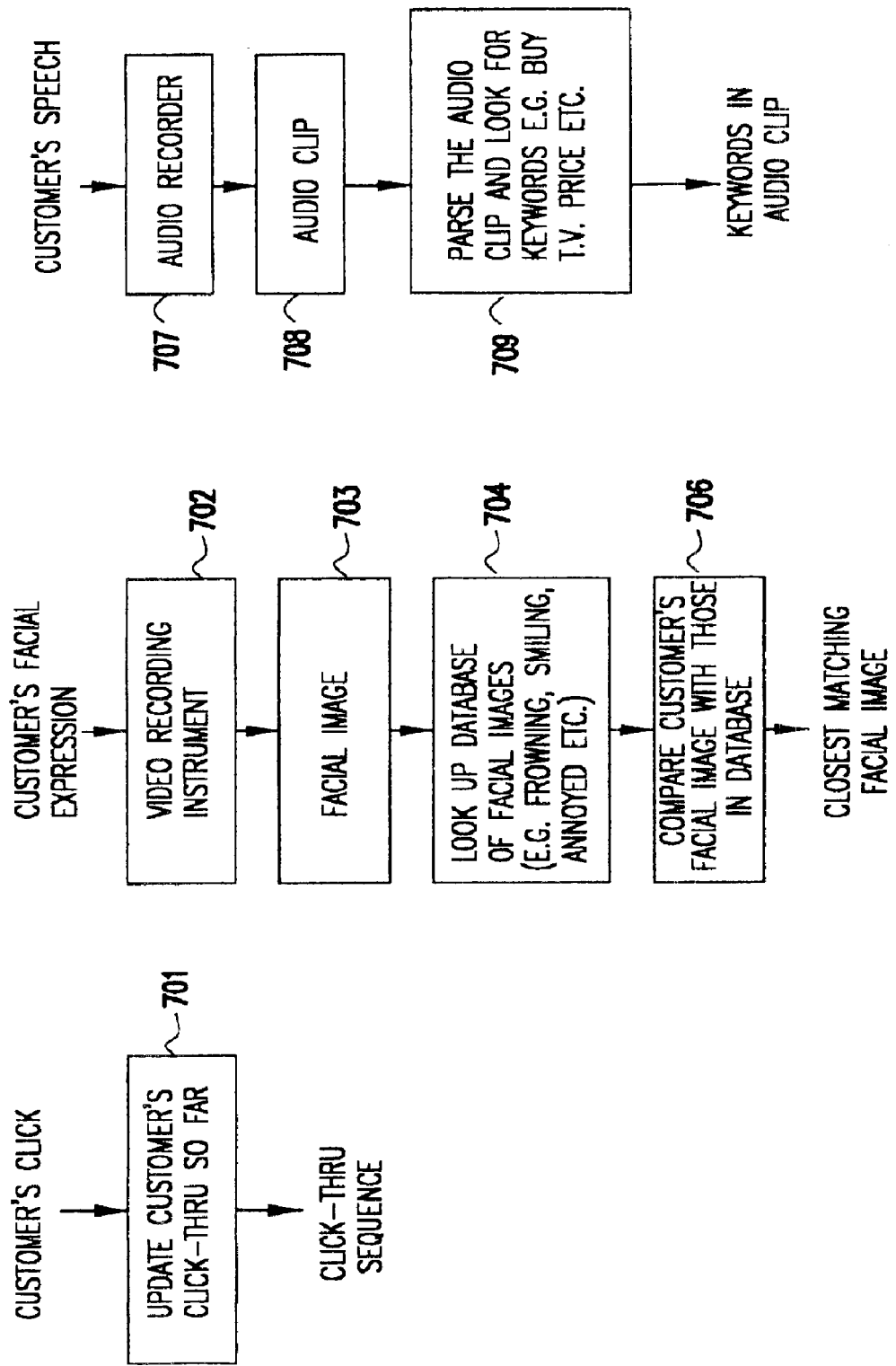
FIG. 7 is a flowchart showing in more detail the customer behavior monitor of FIG. 1.

FIG. 7 shows in more detail the customer behavior monitor 105 in FIG. 1. It is assumed that there is a video conferencing mechanism in place between the e-commerce site and the customer. By that, what is meant is a human computer interface which captures the customer's (conversely, the seller's) actions, such as speech, facial and body expressions. This interface typically is constituted by a video (i.e., television) monitor and a telephone or other communication device including a cellular telephone that can transmit signals in a wired or wireless fashion to the e-commerce site's (conversely, the customer's) behavior monitor.

As shown in FIG. 7, the behavior monitor receives several inputs, represented here by the customer's click, the customer's facial expression and the customer's speech. The customer's click is input to module 701 which updates the customer's click-through so far and outputs the customer's click-through sequence. The customer's facial expression is input to module 702 which is typically a video recording instrument that provides as an output a facial image 703. This image output is searched in a database of facial images at 704. Comparator 705 compares the customer's facial image with those of the database to determine, for example, if the customer is frowning, smiling, annoyed, etc., and than outputs the closest matching facial image. The customer's speech is input to module 706 which is typically an audio recorder that provides an audio clip output 707. A parser 708 parses the audio clip and looks for key words.

Figure 8:
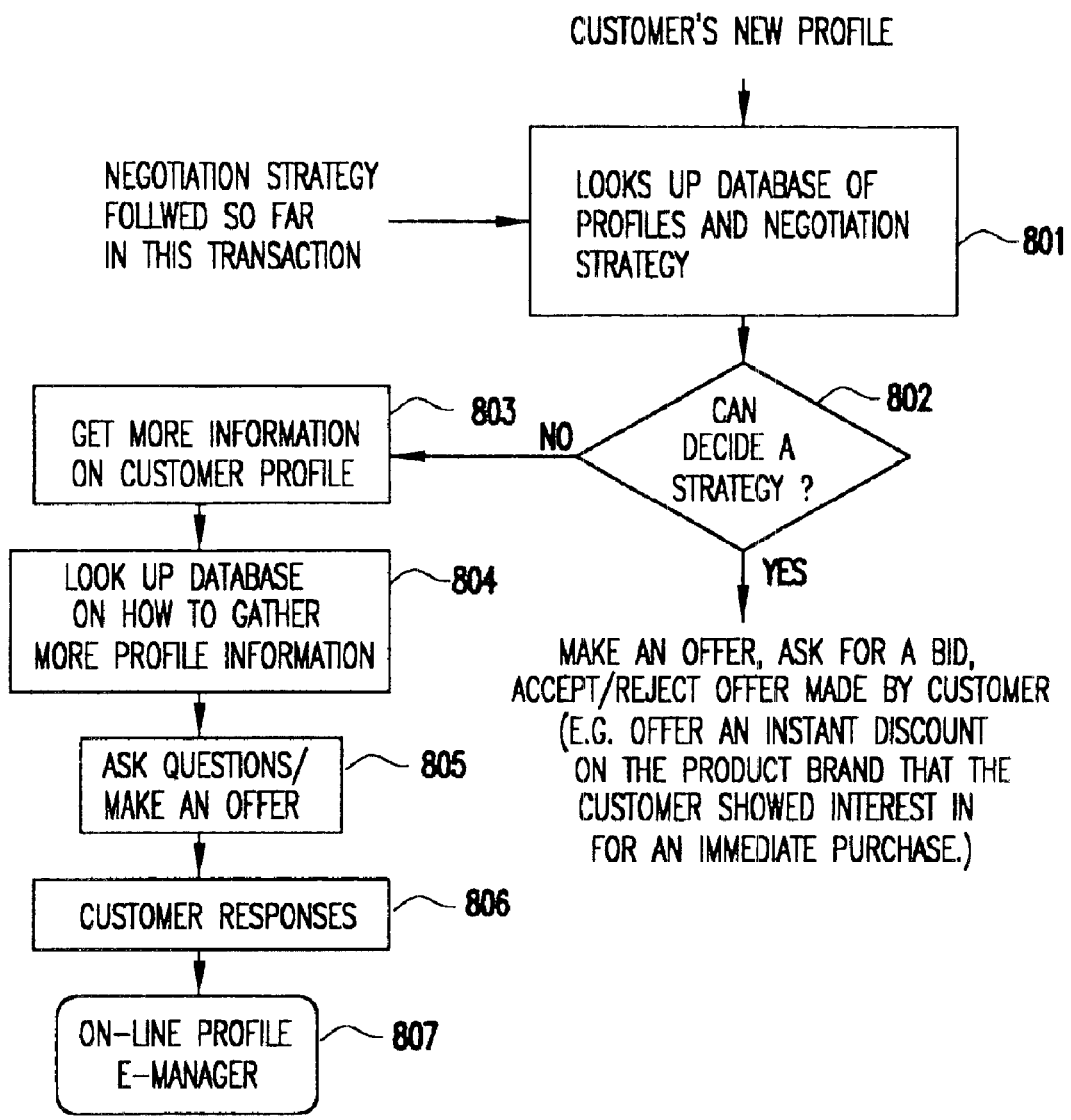
FIG. 8 is a flowchart showing in more detail the e-negotiator of FIG. 1.

The e-negotiator 107 of FIG. 1 is shown in more detail in FIG. 8. The e-negotiator receives as inputs the customer's new profile and the negotiation strategy followed so far in this particular transaction. These inputs are used to look up a database of profiles and negotiation strategies in 801. A determination is made in decision block 802 as to whether a strategy can be decided on the basis of the database search and, if so, that strategy is followed. For example, the strategy may be to make an offer, ask for a bid, accept or reject an offer, etc. If, on the other hand, a strategy cannot be decided based on the database search, more information is retrieved from the customer profile in function 803. A search is made of the database on how to gather more profile information in function 804. This may include asking the customer more questions directly in function 805 and perhaps making an offer. The customer's responses are received at function 806, and this information is returned to the On-line Profile e-manager at 807.

From the foregoing, the computer assisted on-line negotiation method can be seen as a type of search, with buyers and sellers searching through a space of feasible solutions and trying to determine the optimal one for themselves. In the most general embodiment of this invention, the e-commerce site and the customer both judge each other, formulate each other's profile and negotiate accordingly. When the customer visits the e-commerce site, both the customer and the e-commerce site assign some initial profile to each other that is based on the information available (at the time of assignment). While they interact, each captures the other's actions and updates their respective profile assignments and negotiation strategies accordingly. Again, in the most general form of the embodiment, the actions need not be only "click-through streams" but may involve the Human-Computer Interfaces on both sides. These interfaces may include speech, facial and body expressions, much the same as in a traditional commercial transaction.

Therefore, while the invention has been described in terms of a single preferred embodiment, those skilled in the art will recognize that the invention can be practiced with modification within the spirit and scope of the appended claims.

What is claimed is:

1. A computer assisted on-line negotiation method comprising the steps of:

generating off-line by an on-line e-commerce site static customer profiles based on past history that the site has about various customers, including multiple value attributes;

assigning by the on-line e-commerce site a static customer profile to a new customer visiting the on-line e-commerce site, the initial assignment to a profile being based on said static customer profiles and whatever information is available about the customer at the time of assignment;

capturing at a customer computer interface the on-line e-commerce site's actions, said actions being observed prior to a visit by the customer to the site for a negotiation;

formulating at said customer computer interface a predetermined profile of the on-line e-commerce site based on past history that the customer computer interface has about various e-commerce sites, including multiple value attributes and said captured actions;

negotiating by the on-line e-commerce site with the customer computer interface based on a dynamically changing profile of the customer;

negotiating by the customer via said customer computer interface with the on-line e-commerce site based on a dynamically changing profile of the site;

dynamically changing by the on-line e-commerce site the customer's static profile during negotiations based on an observed behavior of the customer via the customer computer interface; and dynamically changing by the customer computer interface the on-line e-commerce site's predetermined profile during negotiations based on an observed behavior of the on-line e-commerce site;

wherein said customer profiles are comprised of computer stored information usable to the advantage of the e-commerce site in said on-line negotiation with customers and said e-commerce site profile is comprised of computer stored information usable to the advantage of the customer in said on-line negotiation.

2. The computer assisted on-line negotiation method recited in claim 1, further comprising the step of updating by the on-line site past history information based on the negotiations with the customer, said customer using said customer computer interface in the negotiations.

3. The computer assisted on-line negotiation method recited in claim 2, wherein the attributes included in the past history information include non-quantitative information.

4. The computer assisted on-line negotiation method recited in claim 3, wherein the non-quantitative information includes season and time of day.

5. The computer assisted on-line negotiation method recited in claim 1, further comprising the steps of:

capturing by the on-line e-commerce site direct interactions by the customer with the on-line e-commerce site via the customer's computer interface, said direct interactions including the customer's "click-through stream"; and analyzing said direct interactions with the on-line e-commerce site to update the customer's dynamically changing profile.

6. The computer assisted on-line negotiation method recited in claim 5, wherein the other direct interaction includes the customer's voice and physical actions.

7. The computer assisted on-line negotiation method recited in claim 1, further comprising the steps of:

storing at said customer computer interface a formulated profile of the on-line e-commerce site in a database of on-line e-commerce site profiles; and accessing the on-line e-commerce site from the database by the customer using said customer computer interface to begin negotiations with the on-line e-commerce site.

8. The computer assisted on-line negotiation method recited in claim 7, further comprising the step of dynamically modifying by the customer computer interface the on-line e-commerce site's profile during negotiations with the on-line e-commerce site based on actions by the on-line e-commerce site.

9. The computer assisted on-line negotiation method recited in claim 8, wherein actions by the on-line e-commerce site on which the site's profile is dynamically modified include offering of terms, said terms including prices of items for sale, packaged deals and bonuses.

10. A computer implemented decision support system for on-line negotiation, said system including computer readable media having computer code embodied therein, said computer code comprising:

first computer code for generating off-line by an on-line e-commerce site static customer profiles based on past history that the site has about various customers, including multiple value attributes;

second computer code for assigning by the on-line e-commerce site a static customer profile to a new customer visiting the on-line e-commerce site, the initial assignment to a profile being based on said static customer profiles and whatever information is available about the customer at the time of assignment;

third computer code for capturing at a customer computer interface the on-line e-commerce site's actions, said actions being observed prior to a visit by the customer to the site for a negotiation;

fourth computer code for formulating at said customer computer interface a predetermined profile of the on-line e-commerce site based on past history that the customer computer interface has about various e-commerce sites, including multiple value attributes and said captured actions;

fifth computer code for negotiating by the on-line e-commerce site with the customer computer interface based on a dynamically changing profile of the customer;

sixth computer code for negotiating by the customer via said customer computer interface with the on-line e-commerce site based on a dynamically changing profile of the site;

seventh computer code for dynamically changing by the on-line e-commerce site the customer's static profile during negotiations based on an observed behavior of the customer via the customer computer interface; and eighth computer code for dynamically changing by the customer computer interface the on-line e-commerce site's predetermined profile during negotiations based on an observed behavior of the on-line e-commerce site;

wherein said customer profiles are comprised of computer stored information usable to the advantage of the e-commerce site in said on-line negotiation with customers and said e-commerce site profile is comprised of computer stored information usable to the advantage of the customer in said on-line negotiation.

11. The computer implemented decision support system recited in claim 10, further comprising ninth computer code for updating by the on-line site past history information based on the negotiations with the customer, said customer using said customer computer interface in the negotiations.

12. The computer implemented decision support system recited in claim 11, wherein the attributes included in the past history information include non-quantitative information.

13. The computer implemented decision support system recited in claim 12, wherein the non-quantitative information includes season and time of day.

14. The computer implemented decision support system recited in claim 10, further comprising:

tenth computer code for capturing by the on-line e-commerce site direct interactions by the customer with the on-line e-commerce site via the customer's computer interface, said direct interactions including the customer's "click-through stream"; and eleventh computer code for analyzing said direct interactions with the on-line e-commerce site to update the customer's dynamically changing profile.

15. The computer implemented decision support system recited in claim 14, wherein the other direct interaction includes the customer's voice and physical actions.

16. The computer implemented decision support system recited in claim 10, further comprising:

twelfth computer code for storing at said customer computer interface a formulated profile of the on-line e-commerce site in a database of on-line e-commerce site profiles; and thirteenth computer code for accessing the on-line c-commerce site from the database by the customer using said customer computer interface to begin negotiations with the on-line e-commerce site.

17. The computer implemented decision support system recited in claim 16, further comprising fourteenth computer code for dynamically modifying by the customer computer interface the on-line e-commerce site's profile during negotiations with the on-line e-commerce site based on actions by the on-line e-commerce site.

18. The computer implemented decision support system recited in claim 17, wherein actions by the on-line e-commerce site on which the site's profile is dynamically modified include offering of terms, said terms including prices of items for sale, packaged deals and bonuses.

19. A computer implemented decision support system for on-line negotiation, comprising:

a merchant decision support system for an on-line e-commerce site, said system further comprising computer readable media having embodied therein computer code generating off-line static customer profiles based on past history that the site has about various customers, including multiple value attributes, assigning a static customer profile to a new customer visiting the on-line e-commerce site, the initial assignment to a profile being based on said static customer profiles and whatever information is available about the customer at the time of assignment, negotiating with a customer via a customer computer interface based on a dynamically changing profile of the customer, and dynamically changing the customer's static profile during negotiations based on an observed behavior of the customer via the customer computer interface; and a customer decision support system, said system further comprising computer readable media having embodied therein computer code for capturing at the customer computer interface the on-line e-commerce site's actions, said actions being observed prior to a visit by the customer to the site for a negotiation, formulating a predetermined profile of the on-line e-commerce site based on past history that the customer computer interface has about various e-commerce sites, including multiple value attributes and said captured actions, negotiating by the customer via said customer computer interface with the on-line e-commerce site based on a dynamically changing profile of the site, and dynamically changing the on-line e-commerce site's predetermined profile during negotiations based on an observed behavior of the on-line e-commerce site, wherein said customer profiles are comprised of computer stored information usable to the advantage of the merchant in said on-line negotiation with customers and said e-commerce site profile is comprised of computer stored information usable to the advantage of the customer in said on-line negotiation.

* * * * *